(12) United States Patent
Ambrefe, Jr.

(10) Patent No.: US 7,789,401 B2
(45) Date of Patent: Sep. 7, 2010

(54) CARTS FOR USE IN SECURITY SCREENING

(75) Inventor: Joseph T. Ambrefe, Jr., West Chester, PA (US)

(73) Assignee: Securitypoint Holdings, LLC., St. Petersburg, FL (US)

( * ) Notice: Subject to any disclaimer, the term of this patent is extended or adjusted under 35 U.S.C. 154(b) by 441 days.

(21) Appl. No.: 11/603,187

(22) Filed: Nov. 22, 2006

(65) Prior Publication Data
US 2007/0126575 A1    Jun. 7, 2007

Related U.S. Application Data

(63) Continuation-in-part of application No. 11/070,094, filed on Mar. 3, 2005, now Pat. No. 7,633,390, which is a continuation of application No. 10/611,430, filed on Jul. 2, 2003, now Pat. No. 6,888,460.

(60) Provisional application No. 60/393,637, filed on Jul. 3, 2002.

(51) Int. Cl.
B62B 3/00    (2006.01)
B62B 3/02    (2006.01)

(52) U.S. Cl. .................. 280/47.34; 280/79.11

(58) Field of Classification Search .................. 280/35, 280/47.35, 47.36, 47.371, 47.41, 654, 652, 280/651, 659, 43.1, 47.131, 47.17, 47.19, 280/47.2, 47.24, 47.26, 47.34, 63, 79.11, 280/79.2, 79.3, 79.5, 79.7; 312/249.8, 249.13; 705/1
See application file for complete search history.

(56) References Cited

U.S. PATENT DOCUMENTS

| | | | |
|---|---|---|---|
| 2,069,957 A | 2/1937 | Klein | |
| 2,123,257 A | 6/1938 | Provost | |
| 2,206,775 A | 7/1940 | Hoofer | |
| 2,830,825 A * | 4/1958 | Webber et al. | 280/79.3 |
| 2,898,985 A | 8/1959 | Starr | |
| 2,908,985 A | 10/1959 | Hartman | |
| 2,937,947 A * | 5/1960 | Ranney et al. | 426/393 |
| 3,330,576 A * | 7/1967 | Willis | 280/79.3 |
| 3,341,219 A * | 9/1967 | Marini et al. | 280/47.19 |
| 3,722,700 A * | 3/1973 | Cummings | 211/153 |
| 3,762,738 A * | 10/1973 | Christina | 280/47.19 |
| 3,782,747 A * | 1/1974 | Hamilton, Jr. | 280/33.992 |
| 3,976,369 A | 8/1976 | McCardell | |
| 3,995,385 A | 12/1976 | Clipson et al. | |

(Continued)

FOREIGN PATENT DOCUMENTS

WO    WO 99/33723    7/1999

OTHER PUBLICATIONS

Defendants' Initial Disclosure of Prior Art and Production, pp. 153 (Sep. 13, 2007) *Security Point Media, LLC v. The Adason Group, LLC, The Conner Group, and Stephen Conner* (U.S. Dist. Ct. Middle Dist. of FL (Case No. 8:07-CV-00444-SCB-TGW).

*Primary Examiner*—Hau V Phan
*Assistant Examiner*—Bryan A Evans
(74) *Attorney, Agent, or Firm*—Sheppard, Mullin, Richter & Hampton LLP

(57) ABSTRACT

The present invention the present invention relates to methods and systems for performing security screening using trays and a cart to facilitate the management and flow of those trays.

4 Claims, 12 Drawing Sheets

U.S. PATENT DOCUMENTS

| | | | |
|---|---|---|---|
| 3,997,182 A * | 12/1976 | Mortenson | 280/47.27 |
| 4,024,660 A * | 5/1977 | Goto | 40/308 |
| 4,137,567 A | 1/1979 | Grube | |
| 4,170,303 A | 10/1979 | Nolan | |
| 4,679,691 A | 7/1987 | Halloran | |
| 4,823,955 A | 4/1989 | Apps | |
| 4,844,264 A | 7/1989 | Deskiewicz, Jr. | |
| 4,864,511 A * | 9/1989 | Moy et al. | 700/218 |
| 4,928,411 A | 5/1990 | Danis et al. | |
| 5,008,082 A * | 4/1991 | Shaw | 422/65 |
| 5,010,668 A | 4/1991 | Zeligson | |
| 5,097,959 A | 3/1992 | Tilles et al. | |
| 5,190,156 A | 3/1993 | Conaway et al. | |
| 5,192,092 A * | 3/1993 | DiBenedetto | 280/654 |
| 5,329,102 A | 7/1994 | Sansone | |
| 5,337,947 A | 8/1994 | Eskandry | |
| 5,372,471 A * | 12/1994 | Wu | 414/806 |
| 5,381,901 A | 1/1995 | Hundley | |
| 5,388,049 A | 2/1995 | Sansone et al. | |
| 5,390,785 A | 2/1995 | Garric | |
| 5,445,397 A | 8/1995 | Evans | |
| 5,470,427 A | 11/1995 | Mikel et al. | |
| 5,566,961 A | 10/1996 | Snell et al. | |
| 5,575,375 A | 11/1996 | Sandusky et al. | |
| 5,586,493 A | 12/1996 | McEntee | |
| 5,749,305 A | 5/1998 | Jacovelli | |
| 5,820,143 A * | 10/1998 | Rigo | 280/47.19 |
| 5,841,346 A | 11/1998 | Park | |
| 5,845,692 A | 12/1998 | Kellem et al. | |
| 6,079,719 A | 6/2000 | Tisbo et al. | |
| 6,240,667 B1 | 6/2001 | Harney et al. | |
| 6,264,219 B1 | 7/2001 | Smith | |
| 6,356,802 B1 | 3/2002 | Takehara et al. | |
| 6,501,041 B1 | 12/2002 | Burns et al. | |
| 6,507,278 B1 | 1/2003 | Brunetti et al. | |
| 6,676,141 B1 * | 1/2004 | Hadley | 280/47.35 |
| 6,720,874 B2 | 4/2004 | Fufido et al. | |
| 6,745,520 B2 | 6/2004 | Puskaric et al. | |
| 6,877,828 B2 * | 4/2005 | Strong | 312/249.8 |
| 6,888,460 B2 | 5/2005 | Ambrefe, Jr. | |
| 7,012,525 B1 | 3/2006 | Ghioto | |
| 7,210,545 B1 * | 5/2007 | Waid | 180/65.1 |
| 2003/0062373 A1 | 4/2003 | Holland | |
| 2004/0066012 A1 * | 4/2004 | Choi et al. | 280/47.35 |
| 2005/0193648 A1 | 9/2005 | Klein et al. | |

\* cited by examiner

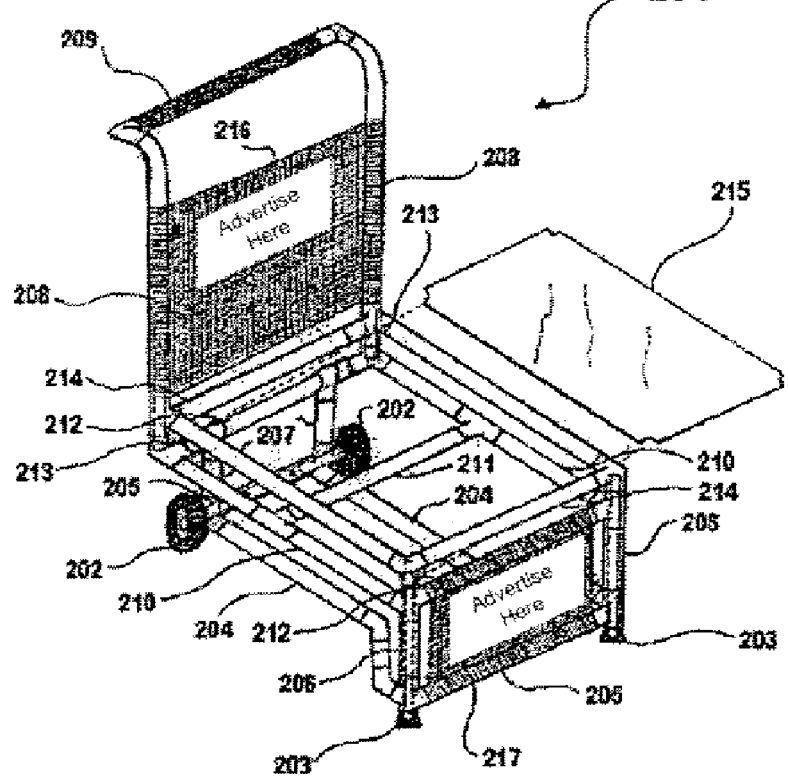

CARTS FOR USE IN SECURITY SCREENING

CROSS REFERENCE TO RELATED APPLICATIONS

The present application is a continuation-in-part of U.S. patent application Ser. No. 11/070,094, filed Mar. 3, 2005 now U.S. Pat. No. 7,633,390, which is a continuation of U.S. patent application Ser. No. 10/611,430, filed Jul. 2, 2003, now issued as U.S. Pat. No. 6,888,460, which is related to and claims the benefit under 35 U.S.C. §119(e) of U.S. Provisional Patent Application Ser. No. 60/393,637 filed Jul. 3, 2002.

FIELD OF THE INVENTION

The present invention relates to systems and methods for the use of a cart in security screening. More specifically, the present invention relates to security screening using trays, and a cart to facilitate the management and flow of those trays.

BACKGROUND OF THE INVENTION

Security areas are typically encountered in places such as an airport security terminals, courthouse entrances and various other places where a person and their luggage or personal items may need to be searched prior to entering or leaving a particular room or area of a building. These security areas typically involve the steps of a person moving through a metal detector area and removing various items from their clothing, pockets or luggage and placing them in a separate area to be either hand checked or machine checked. It is common that people traveling through security areas, such as those in an airport security terminal, may be carrying electronic devices and in particular laptop/notebook-sized computers. These laptop computers are delicate devices which should not be dropped or jostled in an excessive amount as they can be damaged. It is very common that people traveling on business through airport security terminals will have such items sized like a laptop computer so that they can later do work on the plane. The person may have personal items such as wallets, keys, change, cell phones, PDAs and other small bags that need to be checked. These items are typically loose objects that can easily be lost or damaged if not handled in a safe manner.

After the person removes these items from their pockets they are usually placed into a tray or small container that is then either checked by the security personnel by hand or by a scanning device such as an x-ray machine, a particulate matter screener, or some other similar device as will be understood by a person of ordinary skill in the art. The trays that are typically used are non-standardized small trays. In addition, if the person has any electronic equipment such as a camera, a laptop computer or any other device with may have to be checked by the security personnel these items are sometimes put in a larger tray to be later hand checked by the security personnel or passed through a scanning device such as an x-ray machine, a particulate matter screener, or some other similar device as will be understood by a person of ordinary skill in the art.

A disadvantage to the present system used in security areas is that the trays for holding laptop computers are not part of a uniform system and do not protect the items from possible damage. Therefore, it is possible that multiple size trays that do not in any way correspond with one another may be used at a security area thus making storage of the trays when they are not in use cumbersome. A disadvantage to a non-standardized tray system is that when the trays are to be stored they may take up passenger access areas, thereby causing further waiting time as the security personnel moves the unused trays so that a person may pass through a passenger access area. Further it is common that there are inadequately-sized trays for holding large items such as laptop computers, thereby increasing the chance of the computers being damaged by being placed on a conveyer belt without being placed in a tray through a scanning device such as an x-ray machine, a particulate matter screener, or some other similar device as will be understood by a person of ordinary skill in the art. Also, the time taken to search for a possible adequately-sized tray creates inefficiency and extends the waiting time while a person is passing through a passenger access area.

Another disadvantage of the present system is that after the trays are used and the contents are emptied the tray must then be brought to a separate area of the security area. Currently, there is no system for transporting, storing and organizing the trays for easy access. Especially if there are large numbers and various sizes of trays, they may be cumbersome to transport and take up an excessive amount of space. Further, manually lifting and moving the trays can cause back and shoulder injuries, particularly when that action is repeated many times daily.

A disadvantage to the prior system is that the trays which are being used typically are plain trays and do not utilize space provided on the trays to generate additional revenue such as revenue which can be derived from advertising on the trays.

There exists a need for a system for a security area for moving the trays from a starting position to an ending position which allows the trays to be efficiently utilized, gathered and stored to be later used again.

There is also a need for a standardized sizing of the tray to allow for easier transport of the trays when they are not is use and also to provide a cleaner aesthetic appearance.

There is a need for uniformity from airport to airport to assist in the movement of people through the security checkpoints and also in the security process itself.

SUMMARY OF THE INVENTION

The present invention may eliminate the above-described disadvantages and provide for the above-described needs by teaching, for example, a system and device for use in securing a facility, and more particularly, by teaching a tray that may be used to contain various objects that are processed through a scanning device. The present invention may eliminate further disadvantages by teaching a cart that may be used in conjunction with one or more of such trays.

One embodiment of the present invention may be a system comprising a security scanning device through which objects may be passed, having a proximate end and a distal end, a plurality of trays, and a plurality of tray carts adapted to receive the trays, wherein the plurality of trays are provided in a first tray cart at the proximate end of the scanning device, and wherein the trays are adapted to be passed through the scanning device at the proximate end, and wherein the trays are received in a second tray cart after passing through the scanning device at the distal end of the scanning device, and wherein the second cart is adapted to be relocated to the proximate end of the scanning device.

A further embodiment of the present invention may be such a system wherein the scanning device comprises a device selected from the group consisting of a manual inspection station, an x-ray machine, a conveyor belt, and a particulate matter sensor. Another embodiment may be such a system wherein a plurality of the trays comprise nestable trays. A further embodiment may be such a system further comprising the step of substituting a third tray cart containing a plurality of trays for the first tray cart. Yet another embodiment may be such a system wherein the tray cart includes a roughly rectangular base having a bottom surface and a top surface, a plurality of wheels attached to the bottom surface, and a vertical positioning member attached to the top surface. Still another embodiment of the present invention may be such a system wherein the trays are adapted to display information such as advertising on an interior bottom surface of the trays. Yet an additional embodiment of the present invention may be such a system wherein the plurality of trays are adapted to display a unique tray identification number.

An embodiment of the present invention may be a method comprising positioning a first tray cart containing trays at the proximate end of a scanning device through which objects may be passed, wherein the scanning device includes a proximate end and a distal end, removing a tray from the first tray cart, passing the tray through the scanning device from the proximate end through to the distal end, providing a second tray cart at the distal end of the scanning device, and receiving the tray passed through the scanning device in the second tray cart.

A further embodiment of the present invention may be such a method wherein the scanning device comprises a device selected from the group consisting of a manual inspection station, an x-ray machine, a conveyor belt, and a particulate matter sensor. Another embodiment of the present invention may be such a method wherein a plurality of the trays comprise nestable trays. A further embodiment may be such a method wherein the nestable trays further comprise exposed sides capable of displaying information such as advertising. Yet another embodiment of the present invention may be such a method wherein one or more of the tray carts is adapted to permit substantial visual inspection of a plurality of trays placed thereon.

A further embodiment of the present invention may be such a method wherein the tray carts are adapted to be rollable. Another embodiment of the present invention may be such a method further comprising the step of repositioning the second tray cart from the distal end to the proximate end. A further embodiment of the present invention may be such a method wherein a plurality of the trays are adapted to receive an item selected from the group consisting of a laptop computer, a video camera, a camera, a purse, a coat, a pair shoes, and an umbrella. Yet another embodiment of the present invention may be such a method wherein a plurality of the trays are adapted to receive an item selected from the group consisting of a cell phone, a pager, a wallet, a set of keys, and a personal digital assistant.

A further embodiment of the present invention may be such a method wherein one or more of the tray carts comprises restraining walls that are substantially transparent. Another embodiment of the present invention may be such a method wherein one or more of the tray carts comprises a tray platform further including a resilient member. A further embodiment of the present invention may be such a method further comprising the step of providing a third tray cart. Yet another embodiment of the present invention may be such a method further comprising the step of substituting a third tray cart containing a plurality of trays for the first tray cart. Still another embodiment of the present invention may be such a method wherein the trays are adapted to display information such as advertising on an interior bottom surface of the trays. Yet an additional embodiment of the present invention may be such a method wherein the plurality of trays are adapted to display a unique tray identification number.

An embodiment of the present invention may be an apparatus for use as a tray cart for securing a facility including an approximately rectangular base comprising a bottom surface and a top surface, a plurality of wheels attached to the bottom surface of the base, and a vertical positioning member attached to the top surface of the base, wherein the vertical member includes at least one approximately C-shaped tubular member having a first end and a second end, wherein said first end and said second end are connected to said base. A further embodiment of the present invention may be such an apparatus wherein the apparatus is adapted to receive two differentially sized stacks of trays.

An embodiment of the present invention may comprise a tray for use in a security scanning system comprising a base having a first surface and a second surface, four containing walls extending approximately vertically from the base, shock absorbing material on the first surface of the base, and wherein the one or more of the walls displays a unique tray identification number.

In one embodiment, the present invention comprises a cart adapted for use in a security screening system comprising a lower base, a medial base positioned above and parallel to said lower base, an upper base positioned above and parallel to said lower and medial bases, two vertical distal members, and two vertical proximal members. In one embodiment, the vertical distal members and the vertical proximal members are arranged substantially perpendicular to the lower, medial, and upper bases. In another embodiment, each of the vertical distal and proximal members are joined to each of the lower, medial, and upper bases.

In one embodiment, each base of the cart comprises two longitudinal base members and two latitudinal base members. In another embodiment, the longitudinal base members are positioned substantially parallel to each other. In another embodiment, the latitudinal base members are positioned substantially parallel to each other. In yet another embodiment, the longitudinal base members are positioned substantially perpendicular to the latitudinal base members. In yet another embodiment, each end of each latitudinal base member is joined to an end of a longitudinal base member in about a ninety degree angle.

In one embodiment, the medial base further comprises a tray support shelf positioned above said rectangular base. In another embodiment, the cart further comprises two or more wheels. In yet another embodiment, the cart comprises two wheels and each of the wheels is joined to one of said vertical members. In another embodiment, any two of the vertical members extend beyond the upper base and terminate into a handle arranged perpendicular to the vertical members.

In one embodiment, the cart further comprises information displayed on said cart. In another embodiment, the information is advertising. In yet another embodiment, the cart comprises non-metallic materials. In one embodiment, the cart comprises polyvinyl chloride.

Another embodiment of the present invention provides for a method comprising using the cart as described above.

Another embodiment of the present invention provides for a method comprising using a plurality of carts in a security screening system, wherein said security screening system comprises a security scanning device having a proximal end and a distal end, and one or more trays comprising a base having upwardly extending walls and advertising visible to a user of said tray, wherein said trays are initially contained in a first cart positioned at said proximal end of said security scanning device, wherein said trays are passed through said security scanning device from said proximal end to said distal end, wherein said trays are finally contained a second cart at said distal end of said security scanning device, and wherein said second cart is moved to the proximal end of said security scanning device.

Another embodiment of the present invention provides for such a method, wherein the trays further comprise a tray identification number.

Another embodiment of the present invention provides for such a method, wherein said advertising is attached to each of said trays using a method selected from the group consisting of being printed upon said tray, being molded directly into said tray, and being attached to said tray using an adhesive substance. Yet another embodiment of the present invention provides for such a method, wherein said carts further comprise information displayed on said carts. Yet another embodiment of the present invention provides for such a method, wherein said information is advertising.

Another embodiment of the present invention provides for such a method, wherein each of said trays and carts comprises non-metallic materials.

These and other features of the invention may be more fully understood by reference to the following drawings.

BRIEF DESCRIPTION OF THE DRAWINGS

FIG. 20 is a side perspective view of a specific embodiment of the cart of the present invention.

DETAILED DESCRIPTION OF THE INVENTION

Figure 1:
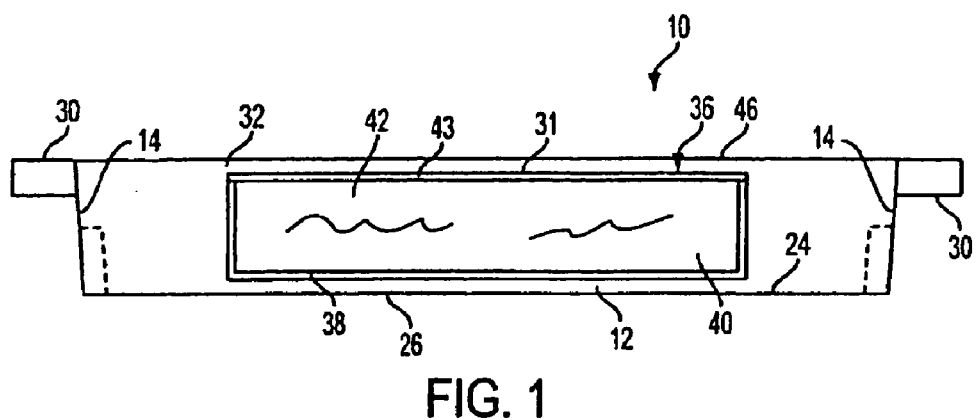
FIG. 1 is a side elevation view of a specific embodiment of the tray of the present invention.

It is to be understood that the present invention is not limited to the particular methodology, compounds, materials, manufacturing techniques, uses, and applications described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "a tray" is a reference to one or more tray and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. All references cited herein are incorporated by reference herein in their entirety.

In specific embodiments, the present invention provides a tray and a system that can be used in security areas to provide efficient movement of loose items, laptop computers and electronic equipment from a starting point to an ending point. Specifically, the present invention, in specific embodiments, may be used in an area such as an airport security checkpoint that may have a metal detector present that a person has to walk through. As the person walks through the security checkpoint they may have to remove such items such as wallets, keys, change and other small objects which are placed into a tray which is either then hand checked or placed through a scanning device separate from the metal detector. At the same time, if a person has an item such as a laptop computer or electronic equipment such as a video camera or digital camera, they are instructed to place such items into a larger size tray which is then passed through a scanning device and/or hand checked.

In specific embodiments, the present invention allows for a system comprising one uniform size of the trays in which items are to be placed so that the trays may easily be stacked and transported after they are used. The trays may also comprise specified areas to allow for information such as advertising materials to be attached. These advertising materials may be changed as often as necessary so that different companies' advertisements can be represented on the trays without the need for manufacturing new trays.

In a specific embodiment the informational materials can be permanently attached to the trays. In specific embodiments, the trays may comprise a durable type that need not be replaced unless lost or considerably worn. In specific embodiments, the trays may comprise a disposable type that may be replaced after the informational material becomes outdated or worn and a new tray is made.

In a specific embodiment, the present invention may comprise two or more different sizes of trays. For example, a larger size tray can be used to hold larger items such as cameras, laptop computers or purses and a smaller size tray can be used when items such as keys, wallets, cell phones, PDAs and watches are to be removed and placed in a tray for inspection.

In specific embodiments, the present invention may comprise a system for facilitating the use and transfer of the trays of the present invention from the starting point in the security checkpoint to the ending point in the security checkpoint. In specific embodiments, the system comprises a first tray or cart that holds several empty trays in a organized stacked manner so that a tray can be removed when needed. The tray is then used by the user and passes through the security checkpoint. After the contents are taken out of the tray the empty tray is then inserted into a second cart that is identical to the first cart. The trays are then stacked in the second cart so that the empty trays are conveniently stored for later use. After the second cart is completely filled with empty trays the second cart can be moved to the position of the first cart, and the empty trays are ready to be used again as needed.

The present invention provides a cost effective way of providing security trays for a security checkpoint while at the same time generating revenue from the advertising that is contained thereon. Further, the present system provides an efficient system for moving the trays for use and removal after they are used.

Security checkpoints are both a time consuming and frustrating part of traveling for frequent fliers and vacationers alike. The present invention provides a system of speeding up the process of processing people through these checkpoints to decrease the likelihood of delays for travelers. The present invention also has the advantage of increasing passenger flow through checkpoints and increasing traveler satisfaction due to the lack of delays.

Figure 2:
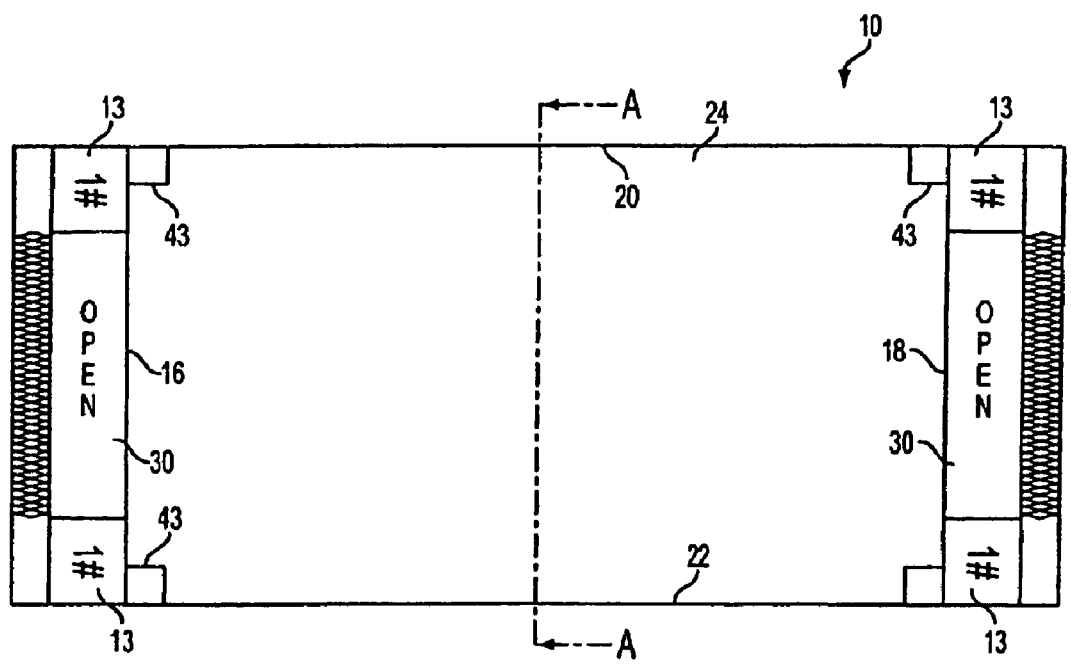
FIG. 2 is a top plan view of a specific embodiment of the tray of the present invention.

Referring to FIG. 1, the side elevation view of a specific embodiment of the tray of the present invention is shown. The tray 10 may comprise a base 12 having upwardly extending walls 14 extending therefrom. In one specific embodiment, base 12 may comprise a rectangular or square shape. In specific embodiments, base 12 may comprise a non-slip bottom, such as to allow the tray to more effectively travel on conveyor belts. In one specific embodiment, the bottom of base 12 may comprise rubber strips that act to prevent slippage. Referring to FIG. 2, tray 10 may comprise a first wall 16 and a second wall 18 positioned substantially parallel to the first wall. The first wall 16 and second wall 18 may be connected to each other by a substantially perpendicular third wall 20 and a fourth wall 22 parallel to the third wall 20. Referring to FIG. 1, in specific embodiments, the walls 14 terminate at an upper lip 46.

Referring to FIG. 2, in specific embodiments, tray 10 may comprise a handle 30 so that the tray can be easily moved by the user. In one specific embodiment, handle 30 may be an extended portion attached adjacent the first wall 16 and second wall 18. The tray may comprise plastic made by injection molding, PVC made by stamping out, or any other appropriate material as will be understood by a person of ordinary skill in the art. In specific embodiments, the tray may comprise clear or translucent plastic so that the contents in the tray can always be seen by the security personnel. However, any rigid material can be used to make the tray. In specific embodiments, the entirety of tray 10 may be constructed from non-metallic materials, to ensure that tray 10 will not set off a metal detector. In other embodiments, tray 10 may be advantageously constructed of a material that is designed not to give off false positives when being used in the screening process.

Indeed, commercially available trays can be used in certain embodiments of the invention. Specifically, Rubbermaid® (Atlanta, Ga.) model number RCP 3349 may be used, as may Tablecraft® (Gurnee, Ill.) model number 1529, Sterilite® (Townsend, Mass.) model numbers 1954 or 1956, or any other commercially available or custom designed tray of similar function.

Referring to FIG. 1, in one specific embodiment the base 12 may comprise a top surface 24 and a bottom surface 26. In specific embodiments, there may be a cavity between top surface 24 and bottom surface 26. In specific embodiments, the top surface 24 may comprise a transparent or translucent material. In one such an embodiment, either top surface 24 or bottom surface 26 may be temporarily removed to allow information such as advertising to be placed within the cavity between top surface 24 and bottom surface 26. For example and not to limit the present invention, top surface 24 or bottom surface 26 could be temporarily removed by further comprising a hinge to allow that surface to swing open, or by being able to be slid out.

Figure 3:
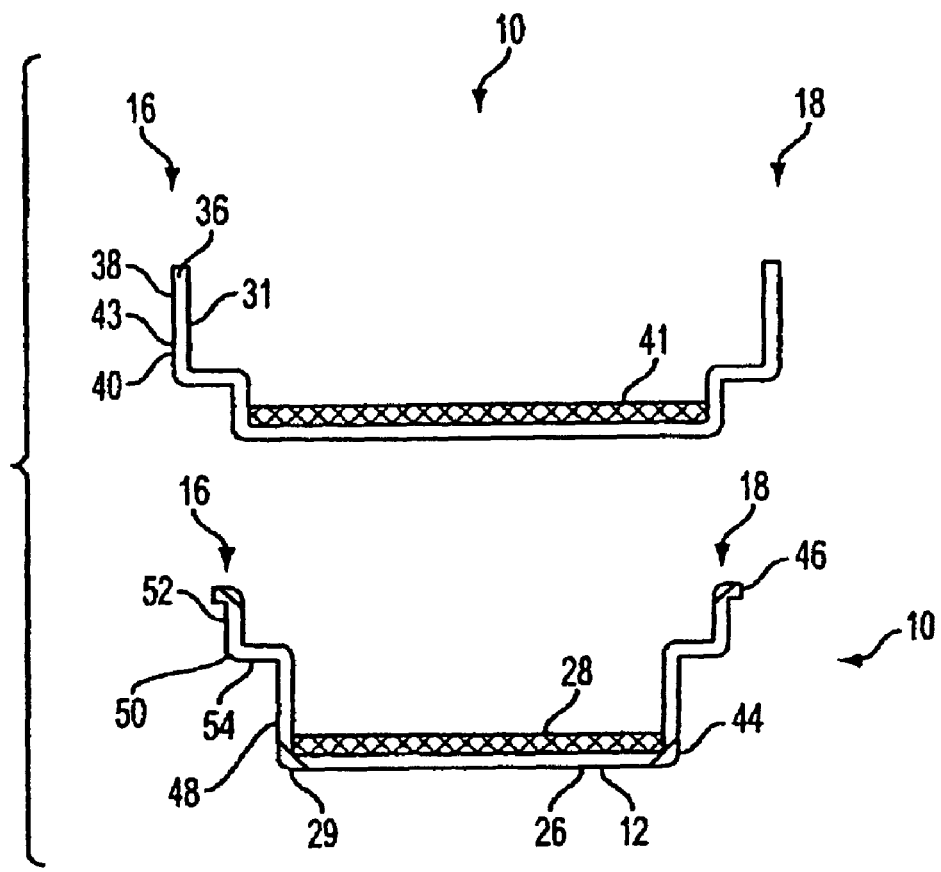
FIG. 3 is a cross-sectional view taken along line A-A specific embodiment of the tray of the present invention as shown in FIG. 2.

Referring to FIG. 3, the top surface 24 of base 12 may be ribbed or flat, and may comprise a padding material 28 positioned thereon so that any objects placed with the tray 10 are cushioned by the padding 28. In specific embodiments, padding 28 may comprise a rubber or neoprene type material to absorb any shock that the objects inside may experience when moving the tray 10. However, it is envisioned that, in certain embodiments, any material which cushions and absorbs vibration can be used. The bottom surface 26 of the base 12 may, in some embodiments, comprise a non-marking material 29 placed thereon so that the tray 10 does not scratch or damage any surface which the tray 10 is placed upon. It is envisioned that, in certain embodiments, both the top padding 28 and bottom padding 29 can be attached by using an adhesive, Velcro® (Manchester, N.H.), or any other means provided that the padding is securely attached to the tray 10. In another specific embodiment, informational material 41 can be placed upon either the top surface 24 or on top of the padding 28. In other embodiments, the informational material 41 can be held on by the use of a semi-permanent adhesive, clips or a Velcro® (Manchester, N.H.) type attachment. Informational material 41 may comprise printed materials such as, without limitation, written text, a picture, or a combination of the two. In other embodiments, informational material 41 may comprise a three dimensional holographic image, or a lenticular image. In specific embodiments, informational material 41 may comprise advertising material such as, without limitation, an ad for a product or service. In other embodiments, informational material 41 may comprise public service announcements.

Referring to FIG. 3, in a specific embodiment, the informational material 41 can be permanently attached to the top of the padding 28. The informational material 41 can be permanently imprinted on the padding 28 or (referring to FIG. 1) on the top surface 24 if a padding 28 is not used. It is envisioned that the informational material 41 can be permanently attached using either a permanent adhesive or another method of imparting a printing on the material such as sublimation or silk-screening. Referring to FIG. 3, it is also envisioned that the informational material 41 itself could be molded into the padding 28 or (referring to FIG. 1) the top surface 24 of the base 12.

Referring to FIG. 2, in specific embodiments, the tray 10 may also comprise an identification number 13 which may be used to ensure that a tray whose contents have been identified as a security threat is subjected to further scrutiny. For example, and not to limit the invention, if security personnel, in examining the contents of a tray 10 using a scanning device, find a possible security threat in that tray 10, the security personnel can then use the identification number 13 to ensure that that tray 10 is examined more thoroughly. As each tray will have a unique identifier associated with it, the identification number 13 can make certain that any given tray 10 is not mistaken for another tray 10, and thus erroneously subjected to or not subjected to further screening procedures. As a further result of this advantageous aspect, the present invention can prevent very costly and inconvenient terminal clearings.

Further, identification number 13 may be used to associate a given tray with a given person. For example, but not to limit the invention, once a security threat has been identified in a tray 10, the security personnel can then identify whose belongings are in the tray using verbal means, by looking at video footage, or through some other way. After such identification has occurred, the owner of the contents of that tray 10 can be detained while their belongings are subjected to further screening procedures.

Alternatively, in specific embodiments, when a person places their belongings into a tray 10, they could be told the identification number 13 of that tray 10, or perhaps given a slip of paper with that identification number 13 on it. In such a manner, each person who places belongings in a tray 10 would be automatically associated with that tray 10. Thus, if the contents of a given tray are determined to be a security threat, the owner of those contents can be easily identified.

In one specific embodiment the identification number 13 may be located on one of the (referring to FIG. 1) upstanding walls 14. However, in certain embodiments of the invention, (referring to FIG. 2) the number 13 can be located anywhere that is visible on the tray 10.

Figure 19:
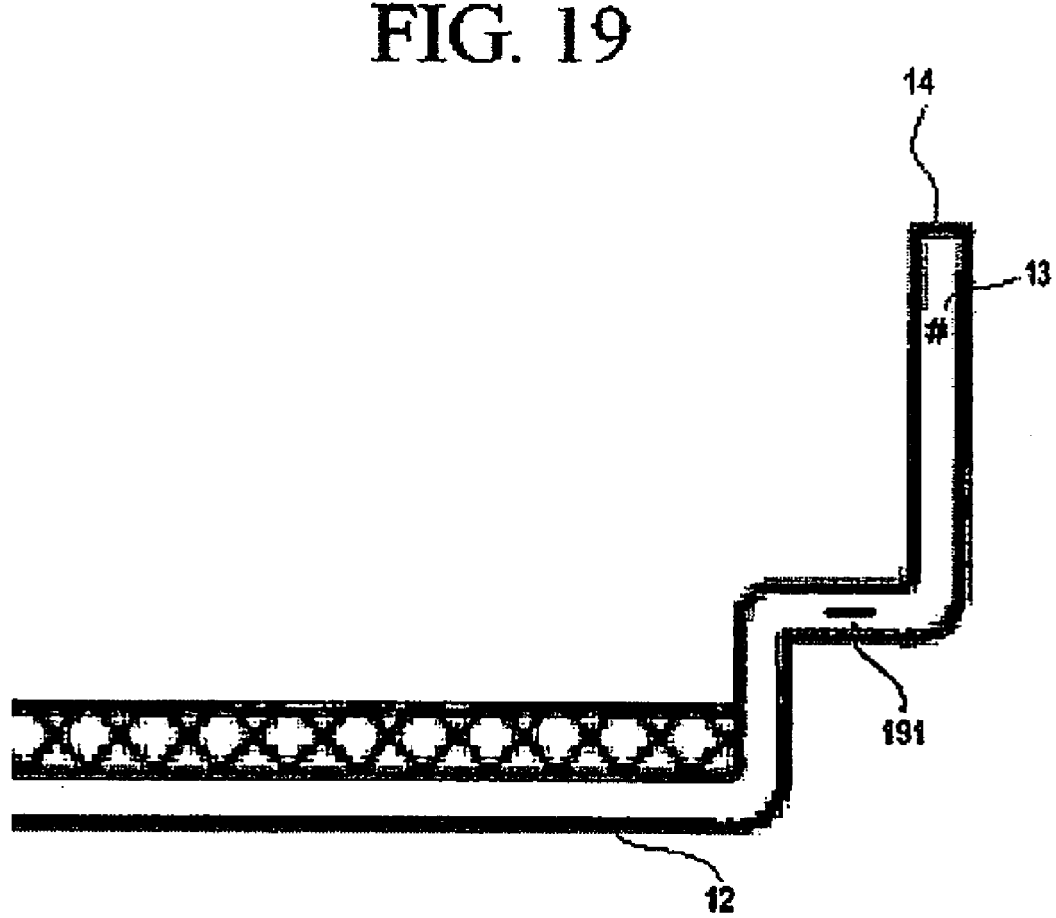
FIG. 19 is a portion of a cross-sectional view of a specific embodiment of the tray of the present invention.

In specific embodiments of the invention, identification number 13 may comprise an x-ray readable, or radiopaque number. In such embodiments, identification number 13 need not be visible on the tray 10, though it may be. In such embodiments, identification number 13 may be embedded somewhere within the tray 10, such as within base 12 or one of the walls 14, as shown in FIG. 19. In specific embodiments, identification number 13 may comprise a number that can be seen by using a scanning device. Thus, identification number 13 may be visible to the person operating the scanning device, even if it is not visible to the naked eye.

In other specific embodiments, identification number 13 may comprise a barcode. Said barcode may be machine-readable, and may be a linear barcode, a stacked barcode, a 2D barcode, or any other type of barcode as understood by one of ordinary skill in the art. In other specific embodiments, identification number 13 may comprise a radio frequency identifier, or RFID. Such RFID may be active or passive, and may be located on, attached to, embedded within, or otherwise associated with tray 10.

In specific embodiments, identification number 13 may comprise a combination of the above possible identification numbers 13. For example, tray 10 may comprise a visible identification number 13 and an x-ray readable identification number 13. Alternatively, tray 10 may comprise an x-ray readable identification number 13 and an RFID identification number 13.

In specific embodiments, tray 10 may also comprise a sensor that detects substances such as, without limitation, trace materials of explosives. Such a sensor could be used in conjunction with a RFID device to notify the screening personnel if trace materials were detected. Alternatively, the sensor could be linked to some other notification device such as, without limitation, a light emitting diode (LED).

In specific embodiments, tray 10 may also comprise an x-ray readable, or radio opaque, calibrated reference point 191, as shown in FIG. 19. In one specific embodiment, such a reference point 191 may be used to determine the approximate size of a given object within the tray 10. For example, but not to limit the invention, reference point 191 may comprise a four inch by one inch radio opaque rectangle, which would allow someone operating a scanning device to readily determine if an object located within a given tray 10 was over 4 inches long. In specific embodiments, such a reference point 191 could comprise any length or shape that would be helpful as a reference for operators of a scanning device. Further, in specific embodiments, a tray 10 may comprise more than one reference point 191, perhaps one aligned vertically and another aligned horizontally. In specific embodiments, the reference point 191 may be placed near the edge of tray 10, such that it will not be confused with or obfuscate the view of the contents of the tray 10. In specific embodiments, the reference point 191 may comprise a reference point that can be seen by using a scanning device. Thus, the reference point 191 may be visible to the person operating the scanning device, even if it is not visible to the naked eye.

Referring to FIG. 1, in one specific embodiment, tray 10 may comprise an interior support post 43 positioned at each corner between each of the individual upstanding walls 14 is (referring to FIG. 2). These support posts 43 are positioned, in some embodiments, adjacent the intersection of each wall and extend upwardly from the base 12. These posts 43 are used so that when multiple trays 10 are stacked inside one another the base 12 of a second tray 10 placed inside of a first tray 10 will rest upon the support posts 43 and not on the top surface 24 of the base 12. An advantage to this design is that the trays 10 will not become wedged between one another but instead are separated from one another by the height of the support posts 43 to allow the trays 10 to be easily separated. A further advantage to these support posts 43 is that since the support post 43 is connected to the base 12 and the walls 14 in which they attach, they provide additional strength and support to the walls 14 and the joints created at their intersections.

In specific embodiments, tray 10 may further comprise informational material 42, which may comprise printed materials such as, without limitation, written text, a picture, or a combination of the two. In other embodiments, informational material 42 may comprise a three dimensional holographic image, or a lenticular image. In specific embodiments, informational material 42 may comprise advertising material such as, without limitation, an ad for a product or service. In other embodiments, informational material 42 may comprise public service announcements. In specific embodiments, tray 10 may also comprise an information dispenser, which may allow users of the tray to take information with them, such as a coupon or informational pamphlet.

Referring to FIG. 2 it is envisioned that, in specific embodiments, the first wall 16, second wall 18, third wall 20 and fourth wall 22 can each comprise (referring to FIG. 1) a window 36 on the outer surface 32 opposite the inner surface 34 of each wall. The window 36 may be used so that informational material 42 can be placed within the window 36 so that people using the tray 10 and the people passing through the security checkpoint will be able to see the information 42. In one specific embodiment, the window 36 can be formed on the outer surface 32 of each of the walls 14, however, for exemplary purposes and not to limit the present invention, the structure of the window 36 on the third wall 20 will be described in detail with the remaining walls having the same structure. In specific embodiment, informational material 42 may comprise a three dimensional holographic image, or a lenticular image.

In specific embodiments, the window 36 may comprise an inner recess 40 that is created by the outer surface 32 of the first wall 16 and an outer cover 38 that is attached over the outer surface 32 of first wall 16. The outer cover 38 may comprise a transparent or translucent material depending on the user's needs. It is envisioned that a portion of the peripheral edge of the window 36 may be either adhesively attached to, or molded into, the outer surface 32 of the first wall 16. However, an open portion 31 may be allowed to remain so that informational material 42 can be placed in the recess 40. Between the outer surface 32 and the outer cover 38 the inner recess 40 is formed which is sized to allow information 42 to be placed within the inner recess 40. The informational material 42 can be made of a thin paper-like material or any other material such as a plastic or metal provided that it fits within the inner recess 40. In specific embodiments, the informational material 42 may be of flat configuration and may comprise an outer surface having printing thereon with this side being positioned adjacent the outer cover 38 so that it can be seen through the transparent or translucent outer cover 38. It is envisioned that a seal 43 can be placed above the inner recess 40 to close off the space between the outer cover 38 and the outer surface 32 to prevent the informational material 42 from falling out of the inner recess 40. In specific embodiments, the seal 43 may comprise a hinged type construction that allows the seal 43 to be selectively moved to either prevent or allow material to be removed from the inner recess 40. In specific embodiments, the seal 43 may comprise a removable friction type material such that it can be removed when needed but does not easily fall out of the recess 40. In specific embodiments, the seal 43 may comprise a tape-like seal that is removable. In certain specific embodiments, seal 43 may comprise a seal that is disposable.

An advantage of certain embodiments of the present invention is that various informational materials 42 can be easily interchanged in the windows 36 when needed because the informational materials 42 are not permanent.

In a specific embodiment, the informational material 42 can be permanently attached, temporarily attached, imprinted upon, molded into, or otherwise associated with any of the walls of the tray. It is envisioned that the informational material 42 can be permanently attached to (referring to FIG. 2) base 12, first wall 16, second wall 18, third wall 20 or fourth wall 22. In another embodiment, the informational material 42 may be attached, temporarily attached, imprinted upon, molded into, or otherwise associated with any surface on tray 10. In a specific embodiment, the informational material 42 may be created separately from tray 10 and attached to the surface of tray 10 using an adhesive of a permanent or temporary nature. In a specific embodiment, the informational material 42 may be created separately from tray 10 and placed inside of tray 10 along the top surface 24 of base 12.

Referring to FIG. 1, the informational material 42 can be permanently attached to tray 10 so that inadvertent removal of the informational material 42 can be prevented. It is envisioned that the informational material 42 can be silk-screened or imprinted on the outer surface of the tray 10. After the tray 10 has been used, and if the informational material 42 has been worn partially away, the tray 10 can be disposed of and a new tray 10 can be created having either the same information or different information.

An advantage to the specific embodiment of a permanent informational material 42 being attached to the tray 10 is that new trays 10 are constantly being made as the older trays 10 are either used or worn. These trays 10 can be of a disposable variety and can be recycled after they are no longer used. Another advantage to the alternative embodiment of the present invention is that the recycling of trays 10 constantly provides a clean and uniform look to all checkpoint areas since the trays 10 that are being used are in good condition. In specific embodiments, tray 10 may be constructed from recyclable materials.

Figure 4:
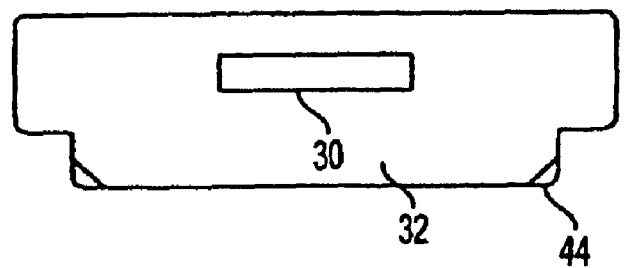
FIG. 4 is a side elevational view of a specific embodiment of the tray of the present invention.

FIGS. 3 and 4 show how, in specific embodiments, the first wall 16 and second wall 18 may comprise an indentation 54 formed in each wall. First wall 16 and second wall 18 may comprise a first section 48 which extends upward from the base 12, a second section 50 which is substantially perpendicular to the first section 48 at a first end 49 connected to a third section 52 at a second end 51 with the third section 52 being substantially perpendicular to the second section 50 and in a parallel plane to the first section 48. The first wall 16 and second wall 18 may comprise these three sections so that the trays can be easily stacked within one another. The horizontal second section 50 and the first section 48 may form the actual indentation 54 itself.

Figure 5:
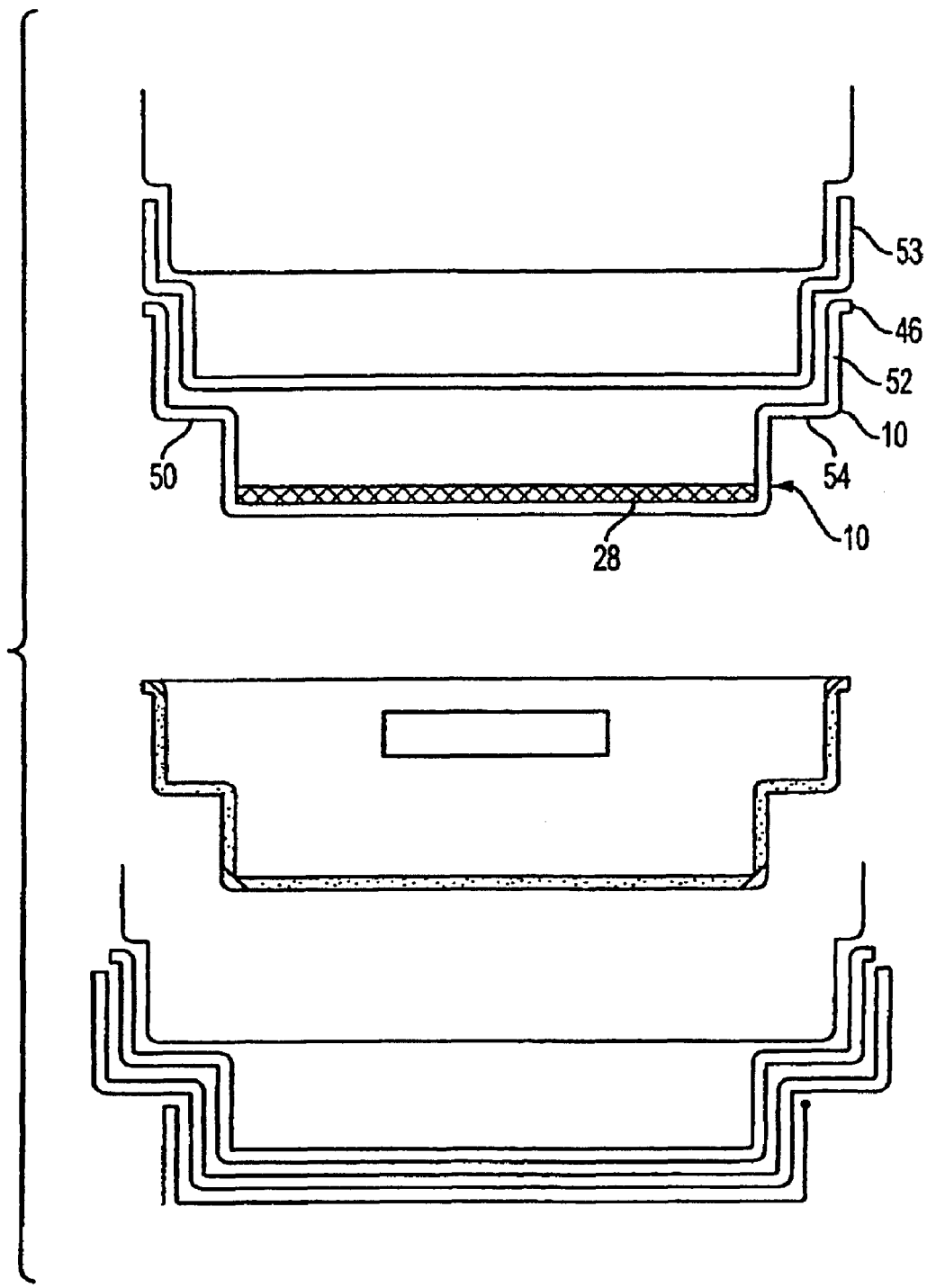
FIG. 5 is a cross-sectional view showing a specific embodiment of the tray of the present invention in a nesting position.

FIG. 5 shows how the trays 10, in specific embodiments, may be nested within one another and how the third section 52 may terminate at an upper lip 46. The upper lip 46 of the third section 52 contacts the second section 50 of a second tray 53 when a first tray 10 and second tray 53 are placed within one another.

An advantage of the nesting system in these specific embodiments is that when the trays are not being used, they can be easily be stacked for storage and used at a later time. A further advantage of the nesting system is that since the informational materials 42 may be on the outer surface of the tray the informational materials 42 can be seen at all times thereby increasing the visibility of the informational materials 42 to potential consumers which are the people being processed through the security checkpoint.

Figure 6:
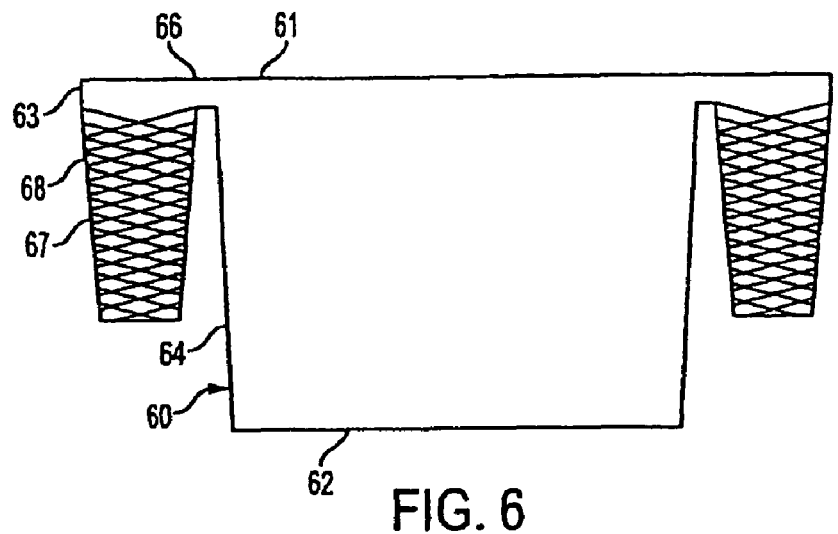
FIG. 6 is a side elevational view of another specific embodiment of the tray of the present invention.
Figure 7:
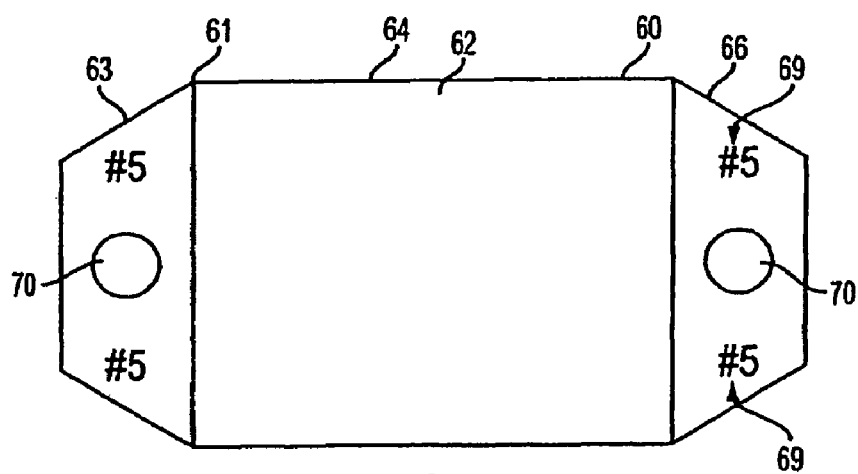
FIG. 7 is a top plan view of yet another specific embodiment of the tray of the present invention.

Another specific embodiment of the present invention, tray 60, is shown in FIG. 6. Tray 60 may comprise a smaller tray for items such as, without limitation, keys, change, cell phones, PDAs and wallets. Tray 60 may comprise base 62 having upstanding walls 64. The upstanding walls 64 may terminate at a second part 66, which is preferably perpendicular to the upstanding walls 64. The second part 66 may comprise first end 61, which is connected to the upstanding walls 64 and extends away from the upstanding wall 64 to a second end 63 which is connected to an extension 68. The extension 68 may extend toward the base 62 either partially or completely to the base 62. The extension 68 is sized to allow for a window 67 to be placed thereon. The construction of the window 67 is similar to the window 36 used in the first tray 10, except that it may be smaller in construction to fit on tray 60. Referring to FIG. 7 a top plan view of tray 60 is shown. Tray 60 may comprise an aperture 70, which may be used as a grip portion on the second part 66 to allow a user to place their fingers within these holes to securely grip the tray 60. An identification number 69 that is unique to each tray 60 can be located on the second part 66 so that the tray 60 can later be identified as being used by a particular person.

Figure 8:
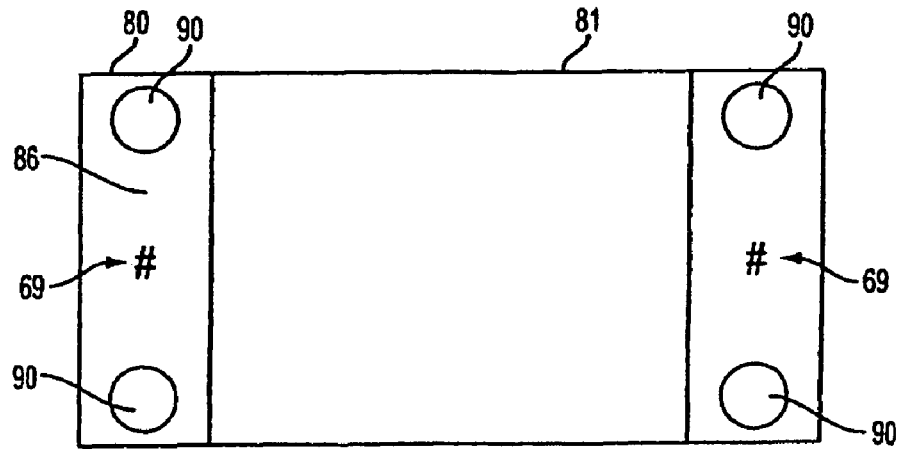
FIG. 8 is a top plan view of yet another specific embodiment of the tray of the present invention.

Another specific embodiment of the present invention, tray 80, is shown in FIG. 8. Tray 80 may comprise the same general shape and construction as tray 60. The difference between tray 60 and tray 80 is that several apertures 90 are positioned on a second part 86 at each of the four corners of the tray 80. An advantage to this design is that a user can securely grip the tray 80 using any of these apertures 90 to move the tray 80 to the desired area. It is envisioned that this tray 80 may comprise on its side wall 81, for example, a similar window 36 as in tray 10, therefore, it will not be described in detail.

Figure 10:
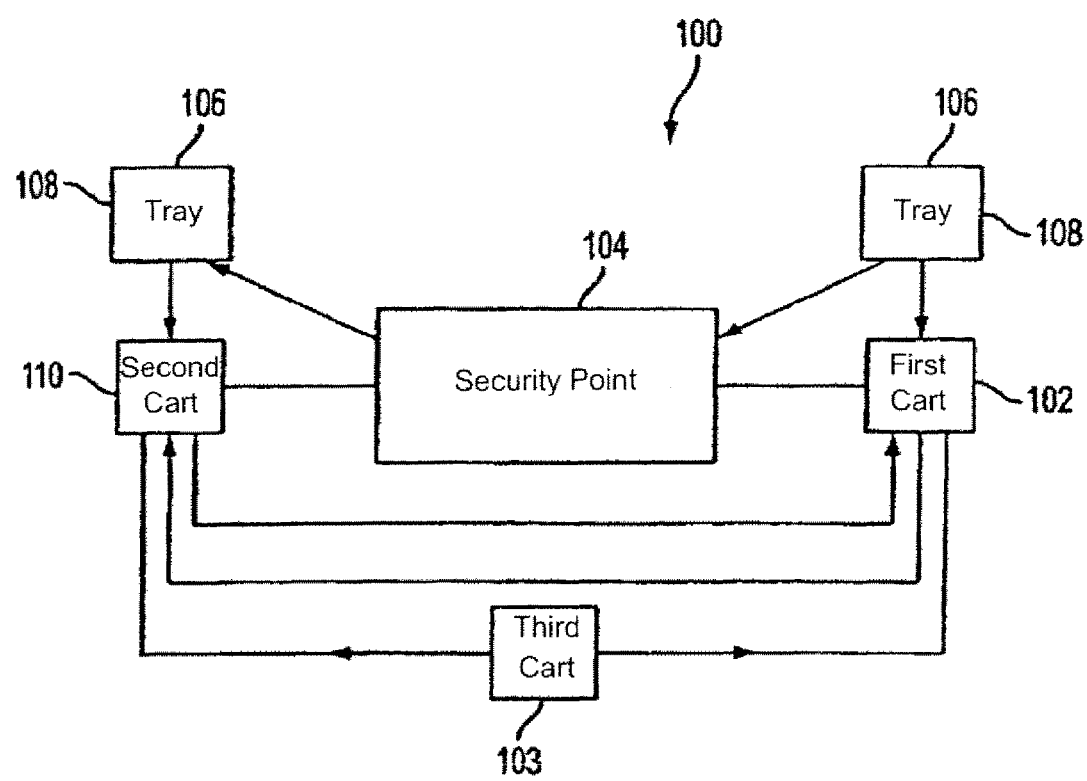
FIG. 10 is a schematic of a specific embodiment of the system of the present invention.

Referring to FIG. 10, a specific embodiment of a system 100 of the present invention is shown. In specific embodiments, the system 100 may comprise using the trays 10, 60, 80 described earlier. The system of the present invention comprises using a first cart 102 at a starting point before the security point 104, using trays 106 and 108, and the using of a second cart 110 which is identical to the first cart 102. Alternatively, only one uniform size of tray could be used, or three or more sizes of trays could be used. While the system will be explained as using two tray sizes, it is understood that it could be carried out with one tray size, or with three or more tray sizes. If the system was carried out with only one tray size, the carts need only be adapted to deal with that one tray size. If the system was carried out with three or more tray sizes, the carts should be adapted to deal with those three or more tray sizes. As a person enters the checkpoint, they are told by security personnel to put any of their carry on baggage or electronic items, such as, without limitation, laptop computers, onto the conveyer belt to be processed through the scanning device. With the present invention, a laptop computer or some other item may be placed by the person being searched into a larger tray 108, which is sized to fit around the laptop computer so that it is not damaged as it is passing over the conveyer belt and through the scanning device. The person is then usually asked by security personnel to remove any loose items and bags and place them in either a smaller tray 106 or a larger tray 108 as previously described depending on the size of the items which are to be searched. A first cart 102 is placed prior to the security point where the user is then asked to remove such items. The first cart 102 is constructed so that it holds the trays 106 and 108 in a stacked position so that the empty trays can easily be taken out of the cart 102 and given to the person. After the person has put the various items into the trays 106, 108, the trays 106 and 108 are given back to the security personnel, who then searches the items in the trays 106 and 108. The user then proceeds through the security point 104. Typically in an airport or other area the user will be through the security point 104 and then, at a later time, receive the trays 106 and 108 which they placed their items into prior to passing through the security point 104 and be told to take their items out of the trays 106 and 108 and proceed out of the security area. After the person has removed their items from the trays 106 and/or 108, the trays 106 and/or 108 can be placed in a second cart 110 which is identical to the first cart 102. The empty trays 106 and 108 are stacked in a specific area of the cart 110 so that the trays can later be used again.

In specific embodiments, after the second cart 110 is completely filed with empty trays 106 and 108, the second cart 110 can be moved, by being pushed, pulled, or otherwise propelled, to the position of the first cart 102 prior to the security point 104 and provide empty trays for people going through the security point 104. After the first cart 102 is depleted of trays 106 and 108 the first cart 102 can be moved, by being pushed, pulled, or otherwise propelled, to the location of the second cart 110 to then receive empty trays 106, 108 at the end of the security point 104. The use of cart 110 to move the trays 106, 108 may advantageously prevent back and shoulder injuries incurred by manually lifting and moving the trays 106, 108. The rotation of the security carts 102 and 110 and the trays 106 and 108 creates an efficient and convenient way to transport the trays from the beginning to the end of the security point 104. In specific embodiments, the system 100 may be used with any appropriate cart, and may be used with only one tray (tray 106, tray 108, or some other appropriate tray) as opposed to using both trays 106 and 108.

It is envisioned that, in specific embodiments, a third cart 103 can be used in addition to the first cart 102 and the second cart 110. The third cart 103 can be used as a back up or spare cart with empty trays 106 and 108 contained within it to be placed in the position of the first cart 102 when needed to further speed up the process of providing trays to people going through the security checkpoint. In one embodiment, the security checkpoint may be configured where the passengers are moved through the checkpoint automatically, e.g., by conveyor or moving walkway. The third cart 103 can also be used in addition to the second cart 110 as an area to place the empty trays 106 and 108 after they are used. The use of the third cart 103 further facilitates the flow of the trays 106 and 108 from the beginning to the end of the security checkpoint during times when peak travel and passenger volume is experienced at an airport security checkpoint. In specific embodiments, four or more carts may be used to further facilitate efficient and easy handling of the trays 106, 108 and maintain a high passenger flow through the security checkpoint. For example, two carts with trays may be provided at the beginning of the security checkpoint, and two empty carts may be provided at the end of the checkpoint, to provide for higher tray and passenger throughput.

Figure 9:
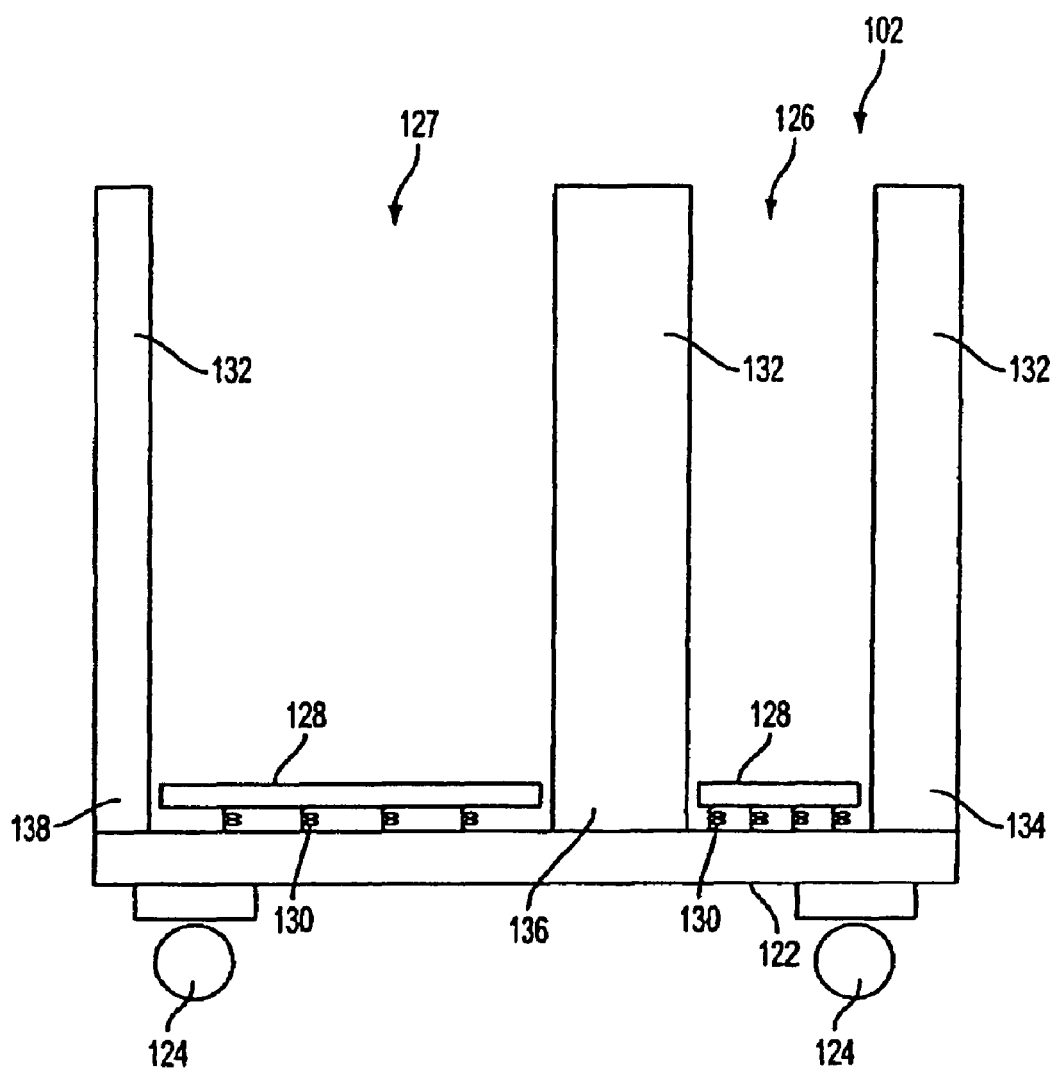
FIG. 9 is a side elevational view of a specific embodiment of the cart of the present invention.

Referring to FIG. 9, a specific embodiment of the cart of the present invention, cart 102, which is adapted to hold two tray sizes, will be described in detail. The first cart 102 may comprise base 122. Base 122 may have, in specific embodiments, wheels 124 attached to the bottom surface thereon. In one specific embodiment the base 122 may comprise a rectangular or square shape with the wheels 124 placed at each corner of the base 122. The base 122 may comprise several walls 132 extending upwardly from the base 122 opposite the wheels 124. In a specific embodiment, the walls 132 may comprise a clear plastic or a metal material such as steel for durability, however, it is envisioned that plastic or any other rigid material can be used, as understood by one of ordinary skill in the art. The walls 132 may be spaced apart from each other to form a first tray recess 126 and a second tray recess 127. The first tray recess 126 is used for holding the smaller trays 106 and the second tray recess 127 is used for holding the larger trays 108. Each of the recesses are constructed so that the trays 106 and 108 can be placed within the recesses so that they do not fall out of the cart 102 and can be transported. In one specific embodiment, both tray recesses 126 and 127 have platforms 128 at the lower end thereof adjacent the base 122. The tray platforms 128 may be supported by resilient members 130 that are attached to both the base 122 and the tray platforms 128. The resilient members 130 may comprise metal springs or any other resilient material such as plastic or rubber. The tray platforms 128 and the resilient members 130 may be used to support the trays 106 and 108 that are placed within the tray recesses 126 and 127. It is envisioned that in a specific embodiment tray platform 128 may not comprise resilient members 130 and that the trays 106 and 108 themselves will rest upon the platform 128. In another specific embodiment, the walls 132 of the cart 102 are divided into a first wall 134 and a second wall 136 that forms tray recess 126. The recess creates a vertical column that allows the trays to be easily inserted into and taken out of the top of the cart 102 when needed thus providing a convenient and organized way of stacking the trays 106 and 108 in the cart 102. The second wall 136 and a third wall 138 form the second tray recess 127. The second tray recess 127 is similar to the first tray recess 126 except that the spacing between the second wall 136 and the third wall 138 is different than the spacing between the first wall 134 and second wall 136 to allow the differently sized trays to fit within the second recess 127.

In specific embodiments, the cart need only be adapted to hold one tray size. In these embodiments, cart 201, shown in FIG. 20, may be used. In specific embodiments, cart 201 may comprise two wheels 202, positioned at the distal end of the cart. Cart 201 may also comprise two stoppers 203, positioned at the proximal end of the cart. In this manner, cart 201 may be rolled from place to place by tilting the cart 201 such that its weight rests solely on wheels 202. However, when cart 201 is positioned on wheels 202 and stoppers 203, it is advantageously stable. Alternatively, cart 201 may comprise some device other than wheels to facilitate movement, such as, without limitation, runners or a hovering device, which may be non-metallic. Alternatively, cart 201 may be simply slid on its structure, moved with a separate carrier or dolly with wheels, carried by personnel, moved along a conveyor belt, or moved in some other manner.

In specific embodiments, cart 201 may comprise a lower base, which may comprise two longitudinal lower base members 204 and two latitudinal lower base members 205. The longitudinal lower base members 204 may be positioned substantially parallel to each other and substantially perpendicular to the latitudinal lower base members 205, which are also parallel. Each end of each latitudinal lower base member 205 may be joined to an end of a longitudinal lower base member 204. In one embodiment, the ends may be joined in about a ninety degree angle, creating a rectangular lower base. Wheels 202 may be joined to the distal latitudinal lower base member 205 to provide the advantages described above, though wheels 202 may be joined to any of the lower base members 204, 205.

In specific embodiments, cart 201 may comprise a medial base, which may comprise two longitudinal medial base members 210, two latitudinal medial base members 212, and a cross support medial base member 211. The longitudinal medial base members 210 may be positioned substantially parallel to each other and substantially perpendicular to the latitudinal medial base members 212, which may also be parallel. Each end of each latitudinal medial base member 212 may be joined to an end of a longitudinal medial base member 210. In one embodiment, the ends may be joined in about a ninety degree angle, creating a rectangular medial base. Cross support medial base member 211 may be positioned to bisect each longitudinal medial base member 210 in a substantially perpendicular fashion, thus dividing the rectangular medial base into two equal sized, smaller rectangles. In specific embodiments, tray support member 215 may be positioned above medial base members 210, 211, 212 to create a shelf. Tray support member 215 may be joined to the medial base members 210, 211, 212, or it may simply lie across them. In specific embodiments, the medial base of cart 201, with or without tray support member 215, may be used to support the bottom of a tray 10, which may or may not have other trays 10 stacked on top of it.

In specific embodiments, cart 201 may comprise an upper base, which may comprise two longitudinal upper base members 213 and two latitudinal upper base members 214. The longitudinal upper base members 213 may be positioned substantially parallel to each other and substantially perpendicular to the latitudinal upper base members 214, which are also parallel. Each end of each latitudinal upper base member 214 may be joined to an end of a longitudinal upper base member 213. In one embodiment, the ends may be joined in about a ninety degree angle, creating a rectangular upper base. In specific embodiments, the upper base of cart 201, may be used to support the sides of a tray 10, which may or may not have other trays 10 stacked on top of it, to keep that tray 10 from falling off of the medial base.

In specific embodiments, the lower, medial, and upper bases of cart 201 may be joined at the proximal end by vertical proximal members 206. Vertical proximal members 206 may be positioned substantially parallel to each other and substantially perpendicular to each of the base members 204, 205, 210, 211, 212, 213, 214. In this manner, the proximal side of cart 201 may resemble a ladder, with the latitudinal base members forming the "ladder" rungs. Further, in specific embodiments, each of the stoppers 203 may be positioned at the bottom of each of the vertical proximal members 206.

In specific embodiments, the lower, and medial bases of cart 201 may be joined at the distal end by lower vertical distal members 207. Lower vertical distal members 207 may be positioned substantially parallel to each other and substantially perpendicular to each of the base members 204, 205, 210, 211, 212. In specific embodiments, the medial and upper bases of cart 201 may be joined at the distal end by upper vertical distal members 208. Upper vertical distal members 208 may be positioned substantially parallel to each other and substantially perpendicular to each of the base members 210, 211, 212, 213, 214. In this manner, the distal side of cart 201 may resemble a ladder, with the latitudinal base members forming the "ladder" rungs. In an alternative embodiment, lower vertical distal members 207 and upper vertical distal members 208 may be continuous vertical distal members.

Further, in specific embodiment, wheels 202 may be attached to lower vertical distal members 207 as opposed to one of the lower base members. Upper vertical distal members 208 may also, in specific embodiments, extend past the upper base and eventually be joined with handle 209, which may be positioned substantially perpendicular to upper vertical distal members 208.

In specific embodiments, cart 201 may comprise one or more information areas, shown in FIG. 20 as information areas 216, 217. Information areas 216, 217 may comprise fabric or some other material stretched between two parallel members of cart 201, such as, without limitation, upper vertical distal members 208 and base members 205, 212, as shown. Information areas 216, 217 may advantageously further comprise advertising. The advertising may be screen-printed or otherwise permanently attached to advertising areas 216, 217. Alternatively, the advertising may be a placard or other apparatus that is temporarily attached to advertising areas 216, 217. In specific embodiments, cart 201 may also comprise an information dispenser, which may allow users of the tray to take information with them, such as a coupon or informational pamphlet.

In specific embodiments, the entirety of cart 201 may be constructed from non-metallic materials, to ensure that cart 201 will not set off a metal detector. In other embodiments, cart 201 may be advantageously constructed of a material that is designed not to give off false positives when being used in the screening process. In specific embodiments, all, substantially all, or some portions of cart 201 may be constructed of polyvinyl chloride (PVC), though it may be constructed of any appropriate material as understood by one of ordinary skill in the art.

The second cart 110 may be identical to the first cart 102 or 201, therefore, it is not described in detail.

An advantage to the present system is that the first cart 102 or 201 and second cart 110 are identical carts, thus when one cart is completely filled it can be moved, by being pushed, pulled, or otherwise propelled, to the proper location where needed. In the alternative, when one cart is completely emptied it can be moved, by being pushed, pulled, or otherwise propelled, to the appropriate area to be later filled with trays 106 and 108.

Furthermore, when there is a high volume of people being processed through the checkpoint, a third cart 103 can be used to hold the trays 106 and 108 to further speed up the movement of the trays 106 and 108 from the end point of the security checkpoint to be transported to the starting point of the security checkpoint. Alternatively, four or more carts may be used to further promote efficiency.

Figure 11:
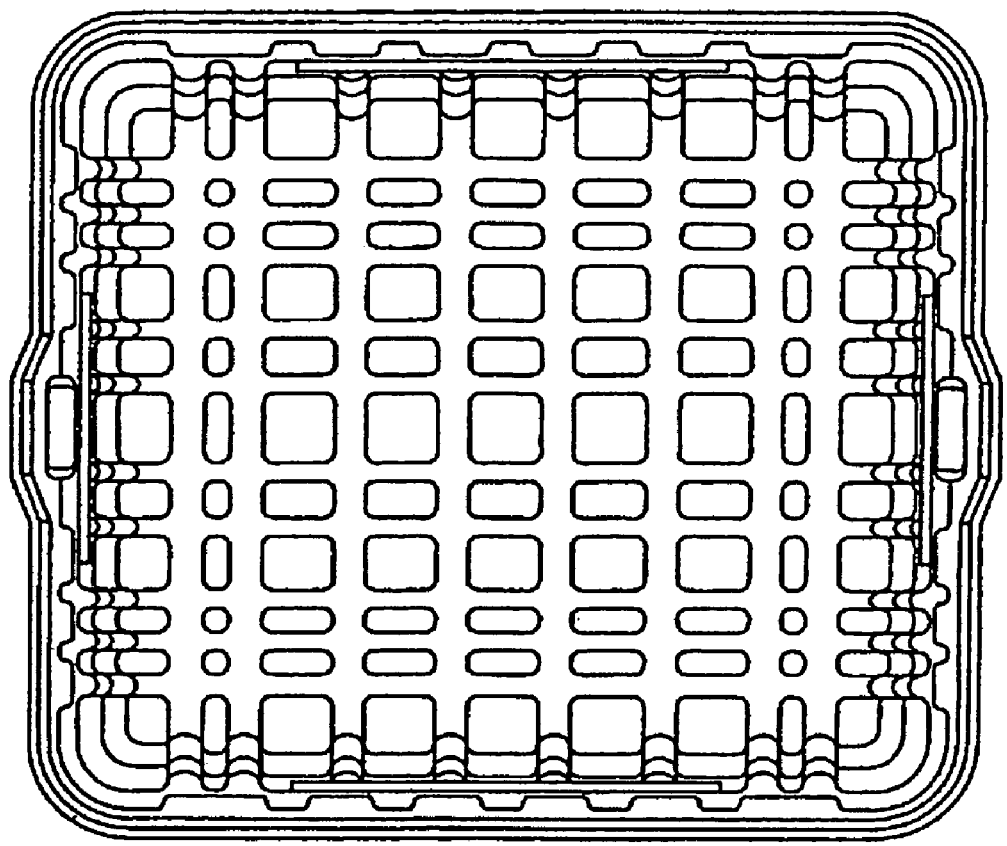
FIG. 11 is a top plan view of yet another specific embodiment of the tray of the present invention.

FIG. 11 is a top plan view diagram of a specific embodiment of the tray of the present invention. In this embodiment of tray 10, the overall width may comprise about 21.61 inches and the interior width measure from (referring to FIG. 3) one first section 48 to the opposite first section 48 may be about 15.81 inches. In FIG. 11, the overall vertical length may be about 13.81 inches.

Figure 12:
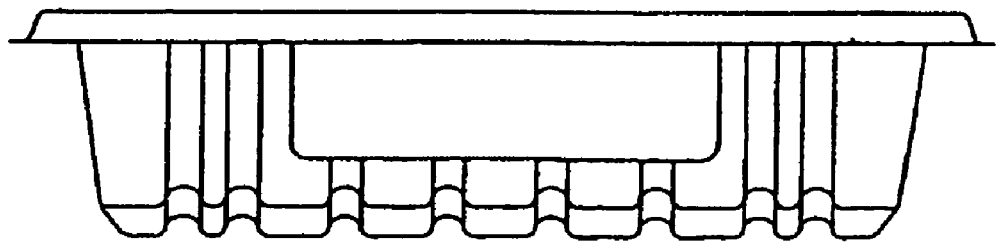
FIG. 12 is a front elevational view of a specific embodiment of the tray of the present invention (a rear view of this embodiment may be a mirror image of the front elevational view).

FIG. 12 is a side view diagram of a specific embodiment of the tray of the present invention. The vertical height of this embodiment of tray 10 may be about 5.0 inches and the height of (referring to FIG. 1) handle 30 may be about 0.63 inches.

Figure 13:
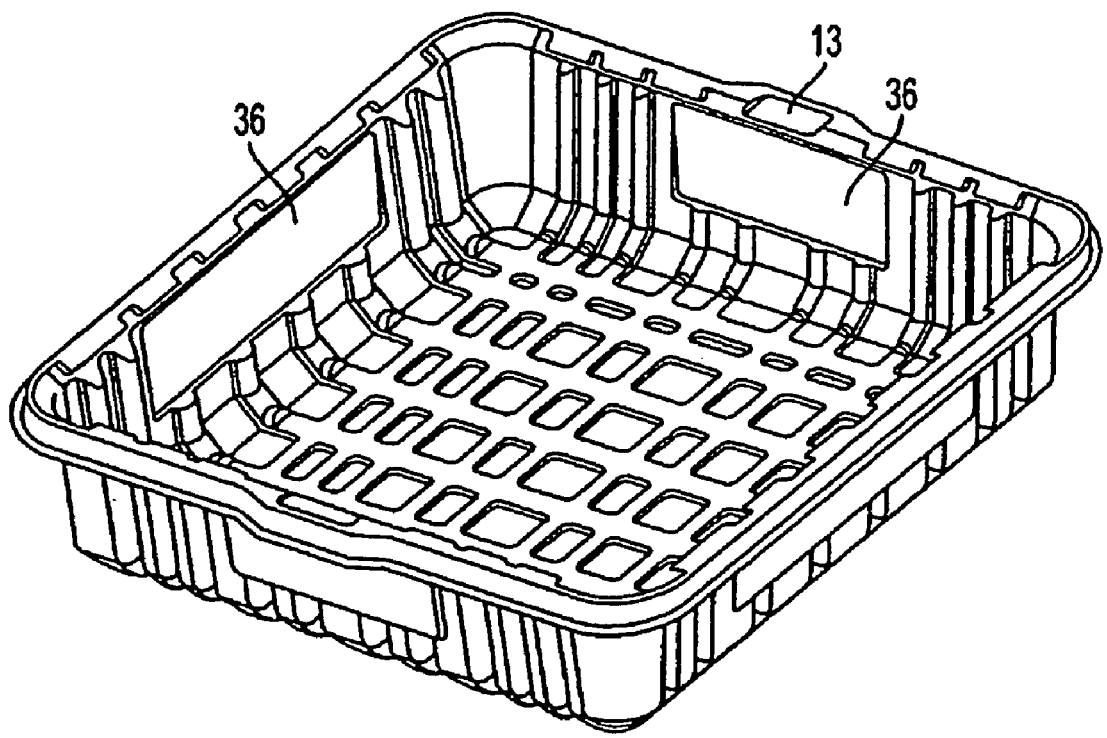
FIG. 13 is a top perspective view of a specific embodiment of the tray of the present invention.

FIG. 13 is a perspective view of a specific embodiment of the tray of the present invention illustrating one possible placement of an identification number 13 and windows 36.

Figure 14:
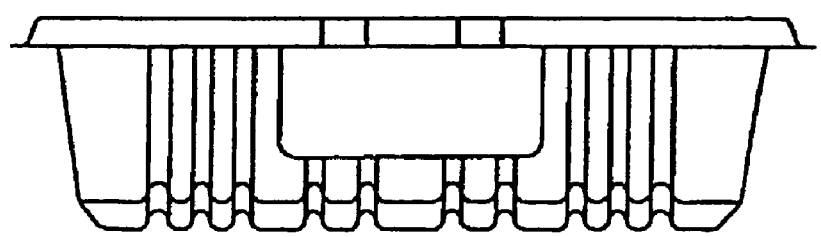
FIG. 14 is a left side elevational view of a specific embodiment of the tray of the present invention (a right side view of this embodiment may be a mirror image of the left side elevational view).

FIG. 14 is an end view of a specific embodiment of the tray of the present invention. It may be similar in appearance to a side view of the same embodiment.

Figure 15:
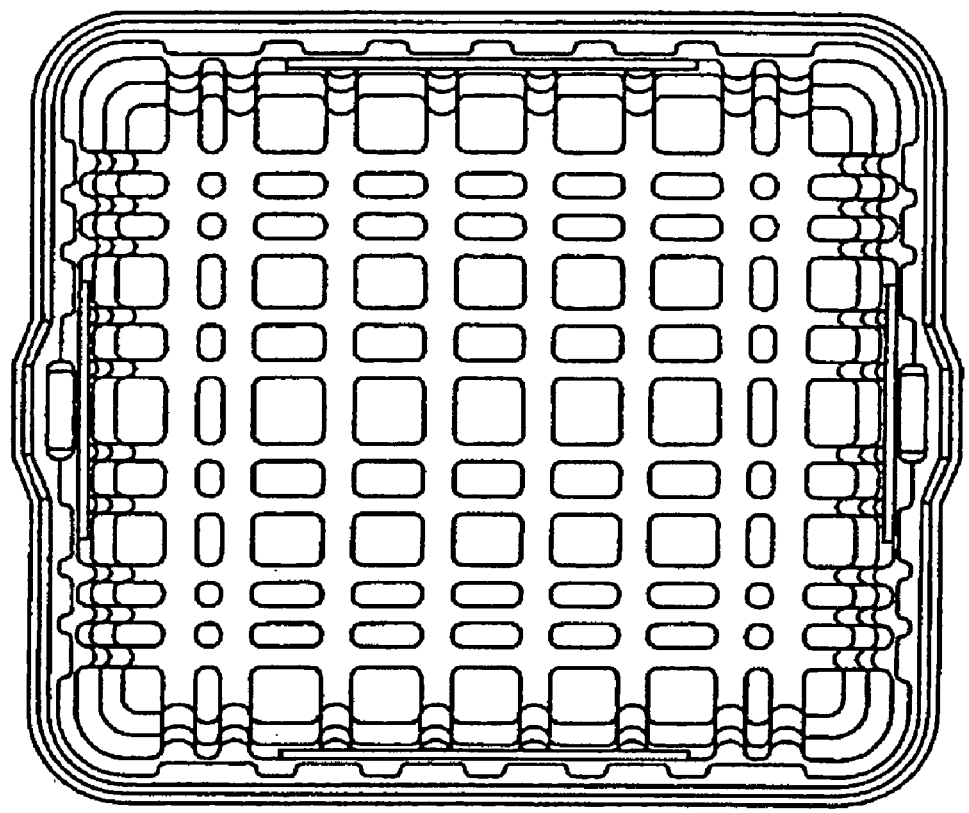
FIG. 15 is a top plan view of yet another specific embodiment of the tray of the present invention.

FIG. 15 is a top view diagram of a specific embodiment of the tray of the present invention. In this embodiment of tray 10 the overall width may be about 13.00 inches and the interior width measure from (referring to FIG. 3) one first section 48 to the opposite first section 48 may be about 8.81 inches. In FIG. 15, the overall vertical length may be about 12.00 inches.

Figure 16:
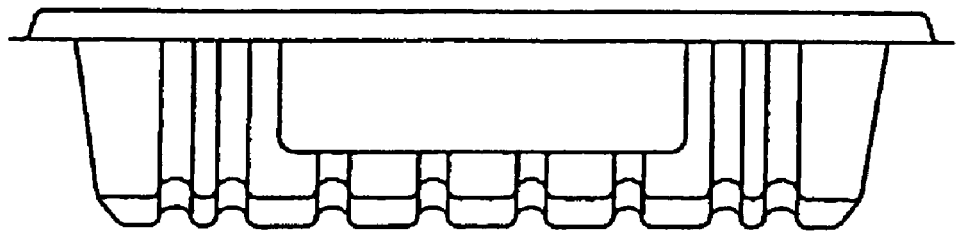
FIG. 16 is a front elevational view of a specific embodiment of the tray of the present invention (a rear view of this embodiment may be a mirror image of the front elevational view).

FIG. 16 is a side view diagram of a specific embodiment of the tray of the present invention. The vertical height of this embodiment of tray 10 may be about 5.0 inches and the height of (referring to FIG. 1) handle 30 may be about 0.63 inches.

Figure 17:
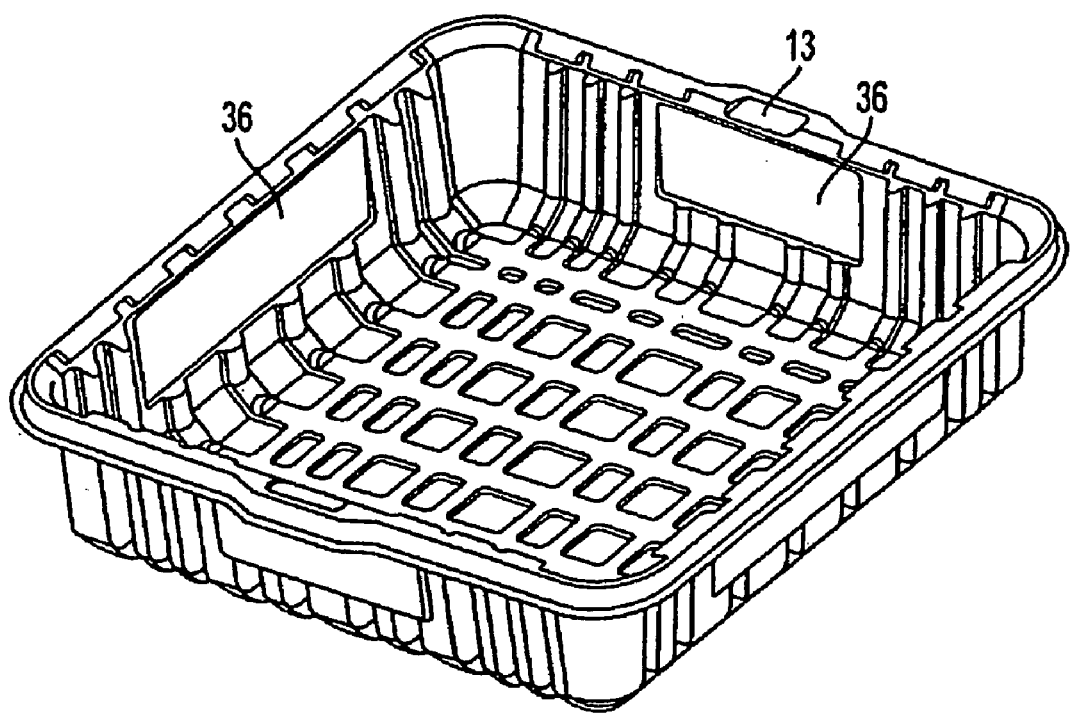
FIG. 17 is a top perspective view of a specific embodiment of the tray of the present invention.

FIG. 17 is a perspective view of a specific embodiment of the tray of the present invention illustrating the placement of an identification number 13 and windows 36.

Figure 18:
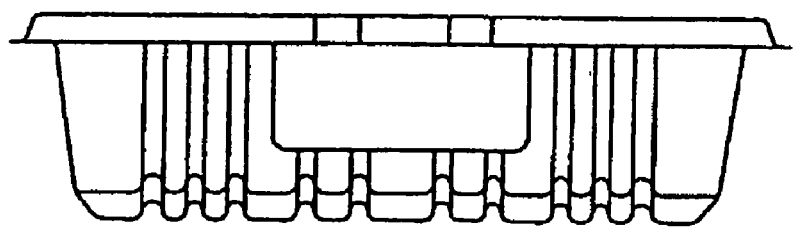
FIG. 18 is a left side elevational view of a specific embodiment of the tray of the present invention (a right side view of this embodiment may be a mirror image of the left side elevational view).

FIG. 18 is an end view of a specific embodiment of the tray of the present invention. It may be similar in appearance to a side view of the same embodiment.

In specific embodiments of the present invention, each component of the invention may be tested with the screening equipment to ensure that the components do not give off "false positives" when being used in the screening process. For example, each tray 10 may be tested to ensure that it does not cause a person operating the scanning device to believe that the tray has contraband in it when it in fact does not.

Although the illustrated embodiments of the present invention have been described herein with reference to the accompanying drawings, it is understood that the invention is not limited to those precise embodiments and that various other changes and modifications may be effected thereon by one skilled in the art without departing from the scope or spirit of the invention, and that it is intended to claim all such changes and modifications as fall within the scope of the invention.

What is claimed is:

1. A method comprising:
    using a plurality of carts in an x-ray security screening system, wherein said x-ray security screening system comprises:
    an x-ray security scanning device having a proximal end and a distal end; and
    a first tray and a second tray each tray comprising a base having upwardly extending walls, and wherein said trays comprise information visible to a user of said trays;
    wherein said trays are stackable wherein said second tray fits into said first tray, said trays initially contained in a first cart positioned at said proximal end of said x-ray security scanning device;
    wherein said trays are passed through said x-ray security scanning device from said proximal end to said distal end;
    wherein said trays are finally contained in a second cart positioned at said distal end of said x-ray security scanning device;
    wherein said second cart is moved to said proximal end of said x-ray security scanning device;
    wherein said trays and said first cart and said second cart comprises non-metallic materials; and
    wherein at least one of said first cart and said second cart comprises information visible to a user of said cart.

2. The method according to claim 1, wherein said trays further comprise a tray identification number.

3. The method of claim 1, wherein said information is comprises advertising.

4. A method comprising:
    positioning a first tray cart containing stackable trays wherein one tray may fit into another, wherein said first tray cart is positioned at the proximate end of an x-ray scanning device through which objects may be passed, wherein said x-ray scanning device comprises a proximate end and a distal end;
    removing a tray from said first tray cart,
    passing said tray through said x-ray scanning device from said proximate end through to said distal end,
    providing a second tray cart at said distal end of said x-ray scanning device,
    receiving said tray passed through said x-ray scanning device in said second tray cart, and
    moving said second cart to said proximate end of said x-ray scanning device so that said trays in said second cart be passed through said x-ray scanning device at said proximate end;
    wherein at least one of said first tray cart or said second tray cart comprises advertising visible to a user of said cart, and
    wherein said tray comprises advertising visible to a user of said tray.

* * * * *